United States Patent [19]
Lohr et al.

[11] 3,907,331
[45] Sept. 23, 1975

[54] TOY VEHICHLE CONSTRUCTION

[75] Inventors: Raymond J. Lohr; Calvin S. Cook; Paul G. Goodwin; Carl J. Merl, all of Erie, Pa.

[73] Assignee: Louis Marx & Co., Inc., Stamford, Conn.

[22] Filed: Jan. 27, 1975

[21] Appl. No.: 544,543

Related U.S. Application Data

[62] Division of Ser. No. 239,156, March 29, 1972, Pat. No. 3,874,700.

[52] U.S. Cl. ............ 280/270; 280/87.02; 280/282; 46/223
[51] Int. Cl.² .......................................... B62K 5/06
[58] Field of Search ......... 280/87.02, 270, 282, 7.1, 280/1.208; 46/223, 222, 221

[56] References Cited
UNITED STATES PATENTS

| | | |
|---|---|---|
| 1,498,427 | 6/1924 | Dean ...................... 280/87.02 R X |
| 1,808,887 | 6/1931 | Dunkley ........................... 280/270 X |
| 3,161,417 | 12/1964 | Goldfarb ............................. 280/7.1 |
| 3,370,861 | 2/1968 | Lenta ........................... 280/1.208 X |
| 3,827,719 | 8/1974 | Lohr et al. ...................... 280/282 X |

*Primary Examiner*—Leo Friaglia
*Attorney, Agent, or Firm*—Blum, Moscovitz, Friedman & Kaplan

[57] ABSTRACT

A toy vehicle in which the front wheel assembly is mounted on the vehicle body for pivotal movement whereby to steer the vehicle and the front wheel assembly has a pair of wheels drivable in a forward direction by oscillating movement of upwardly projecting levers which are hand operated and act as handle bars. The vehicle is particularly suitable as a wheeled vehicle for a child.

1 Claim, 5 Drawing Figures

TOY VEHICHLE CONSTRUCTION

This is a division of application Ser. No. 239,156, filed Mar. 29, 1972 and now U.S. Pat. No. 3,874,700.

BACKGROUND OF THE INVENTION

This invention relates generally to a toy vehicle and to the construction thereof. The invention is more particularly directed to a toy vehicle propelled in one direction only by the operator and to an improved propulsion and steering mechanism. While operator drive toy vehicles are known in the art, the invention is concerned with a vehicle of improved construction which can be relatively inexpensively fabricated of lightweight materials such as plastic and can be readily assembled by the consumer when shipped in a semi-knocked-down condition.

SUMMARY OF THE INVENTION

Generally speaking, in accordance with the invention, a vehicle body forming the seat of the vehicle is provided with a pair of rear, free-wheeling, ground engaging wheels. A front wheel assembly carrying dual ground engaging front wheels is pivotally mounted on the body to effect steering of the vehicle through movement of the entire front wheel assembly. One way drive means propel the vehicle in the forward direction by driving or rotating the front wheels. The drive mechanism is operated by levers which form handlebars so that the operator may grip the handlebars to both drive the vehicle and effect a steering thereof. The drive mechanism can be housed wholly within the front wheel assembly with the drive connection to the front wheels being inboard of said wheels.

Accordingly, it is an object of this invention to provide a toy vehicle of improved construction.

Another object of the invention is to provide a toy vehicle of the ride-on type having an improved driver operated mechanism.

A further object of the invention is to provide an improved toy vehicle which is driver operated through at least one handlebar, with the handlebar serving the dual functions of steering the vehicle and driving same.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
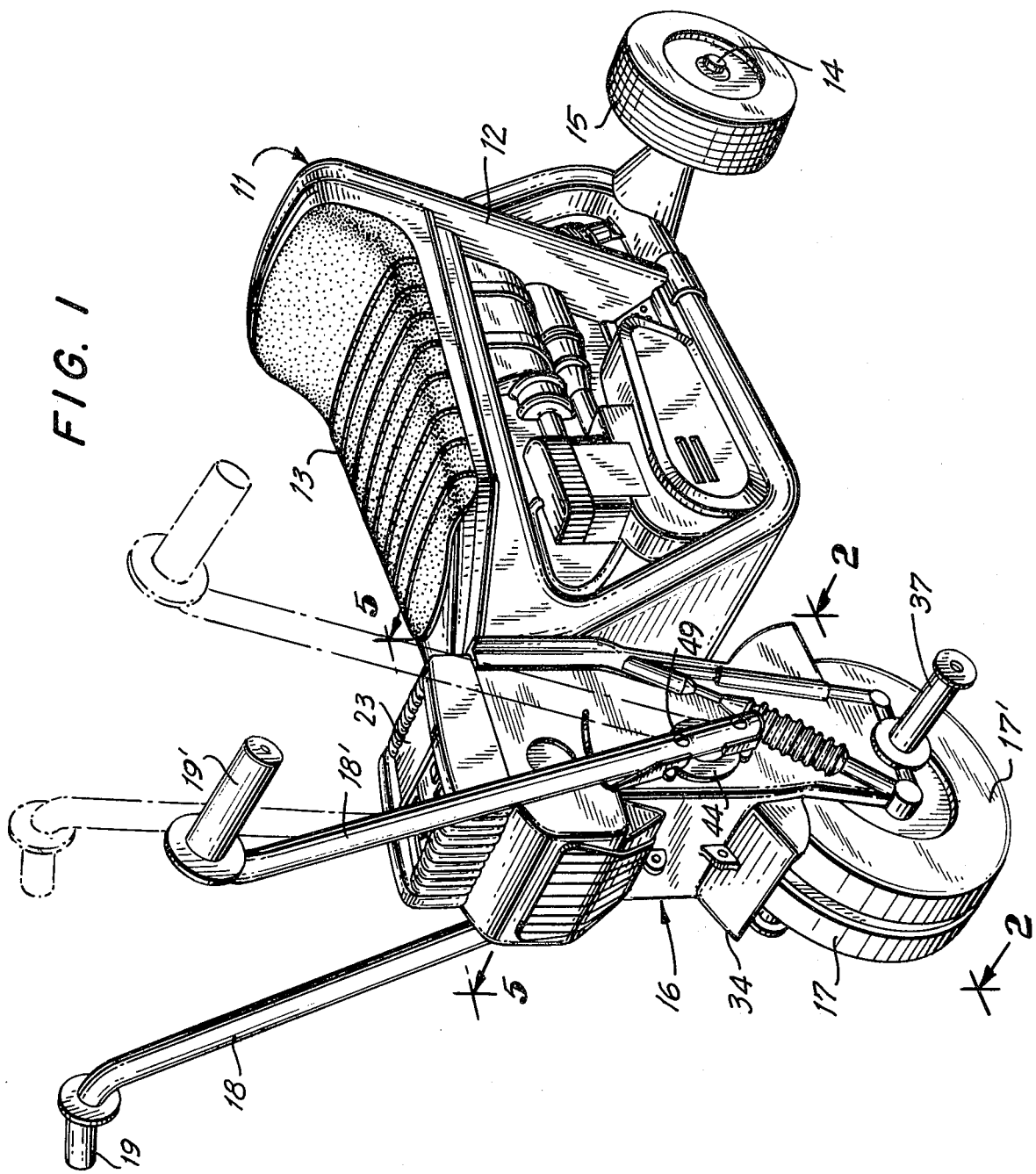
FIG. 1 is a perspective view of a toy vehicle constructed in accordance with a preferred embodiment of the instant invention.

A toy vehicle indicated generally at 11 has a body 12 preferably formed entirely of plastic material with the body preferably being of hollow construction. The upper surface of body 12 is formed to define a seat portion 13 on which a child will sit while riding on the vehicle. A through-axle 14 is journalled in body 12 at the lower end rear portion thereof and mounted for free rotation on the ends of axle 14 are rear ground engaging wheels 15. Only one rear wheel 15 is shown in FIG. 1 but it will be understood that a second rear wheel 15 is carried by axle 14 on the opposite side of body 12.

A front wheel assembly 16 is mounted on body 12 at the front end thereof for pivotal movement along a generally vertical axis as will be hereinafter described. Front wheel assembly 16 carries a pair of ground engaging front wheels 17, 17' by which the vehicle is propelled through a mechanism to be hereafter described, which mechanism is operated by a pair of upwardly extending levers 18, 18' which have out-turned ends 19, 19' to form handlebars that can be gripped by the child riding on the vehicle. The front wheel assembly is pivoted about its vertical axis by suitable operation of the handlebar-like levers 18, 18' and driving action of the front wheels 17, 17' are effected by reciprocation of levers 18, 18' between the full and phantom line positions shown in FIG. 1.

Figure 5:
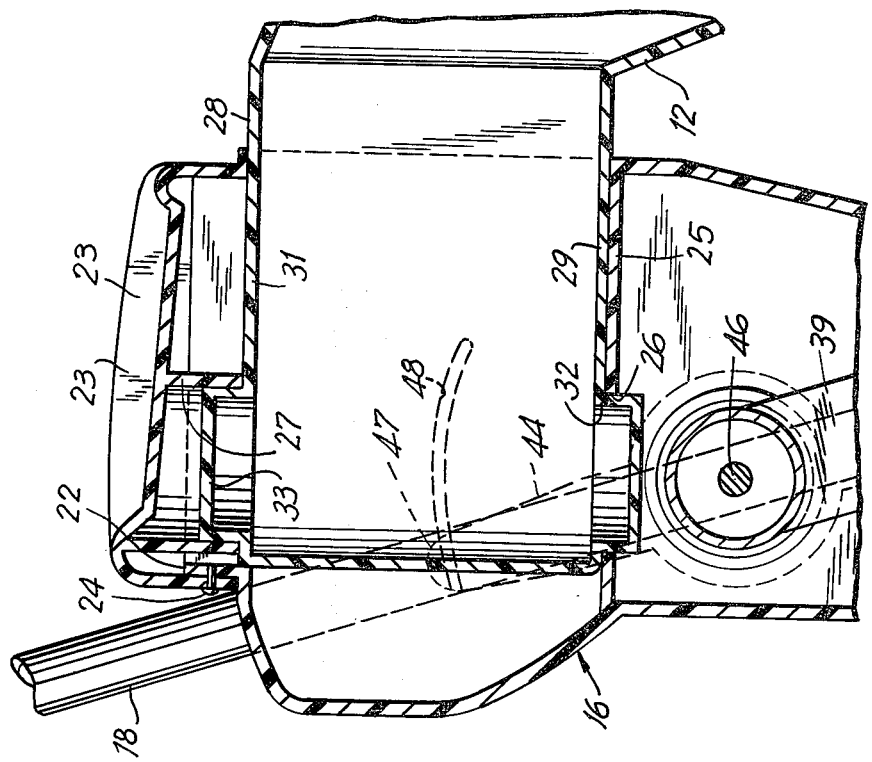
FIG. 5 is a partial sectional view, at an enlarged scale, taken along line 5—5 of FIG. 1.

Referring especially to FIGS. 1 and 5, front wheel assembly 16 includes a generally hollow housing 21 preferably formed of plastic material. Housing 21 terminates in an upwardly projecting peripheral wall 22 on which is removably mounted a cap 23. Cap 23 overfits with and is removably retained on peripheral wall 22 by means of suitable screws 22. Housing 21 includes a transverse wall 25 having a cylindrical aperture 26 therein. Top cap 23 is provided with a cylindrical recess 27 co-axial with cylindrical aperture 26 and defining the turning axis of the toy vehicle.

Body 12 includes a forward extension 28 having a horizontal lower wall 29 and a horizontal upper wall 31. A cylindrical hub 32 extends downwardly from lower wall 29 and a cylindrical hub 33 extends upwardly from upper wall 31 with the cylindrical hubs 32 and 33 being respectively received in cylindrical aperture 26 and cylindrical recess 27 in journalled relationship whereby to provide pivoting between body 12 and front wheel assembly 16. Lower wall 29 is in slidable engagement with the top surface of transverse wall 25 and upper wall 31 is engaged by top cap 23.

During shipment, front wheel assembly 16 is completely disconnected from body 12. In order to assemble the front wheel assembly to the body, it is merely necessary to remove top cap 23, mount cylindrical hub 32 in cylindrical aperture 26, assemble top cap 23 as shown in FIG. 5 and secure it by means of screws 24. With three basic elements all formed of plastic material, a secure but pivoting assembly is easily accomplished with the weight of body 12 applied to front wheel assembly 16 being borne by engagement between lower wall 29 and transverse wall 25.

The mechanism for propelling the vehicle incorporated in the front wheel assembly will now be described.

As best seen in FIG. 1 through 4, housing 21 is formed at its lower end with a fender-like element 34 and depending spaced side walls 35. An axle 36 extends through and is journalled in spaced walls 35. Walls 35 also carry foot rests 37 formed of plastic material integrally with housing 21 and axle 36 may extend into foot rests 37 to provide additional support and reinforcement thereof. When a child is seated on seat portion 13, he may rest his feet on foot rests 37.

Figure 3:
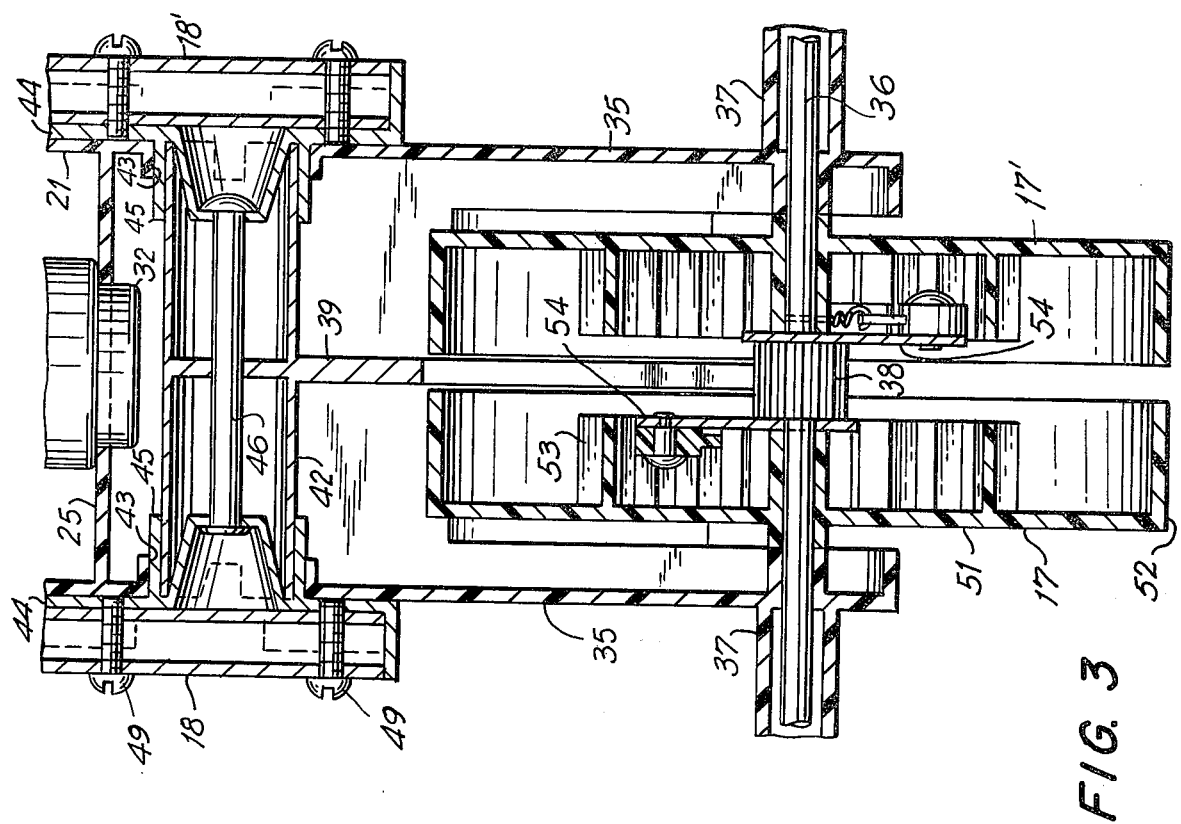
FIG. 3 is a partial sectional view taken along line 3—3 of FIG. 2.

Loosely mounted on axle 36 is a pinion 38 in mesh with rack teeth 41 provided at one end of a plate 39. The other end of plate 39 is formed integrally with a sleeve 42 extending between side walls of housing 21. Formed in the side walls are a pair of oppositely disposed journals 43 which loosely receive the ends of sleeve 42. A pair of brackets 44 are provided each having a sleeve 45. Each sleeve is journalled in one of the journals 43 to rotatably mount each bracket on housing 21. Each bracket 44 also engages with an end of sleeve 42 and a fastener 46 extending between oppositely disposed brackets 44 form a rigidly connected assembly of the two brackets 44 and the sleeve 42. In this manner, rotation of either or both brackets 44 in journals 43 effects a rotation of sleeve 42 and plate 39 to drive pinion 38. As best seen in FIG. 5, bracket 44 extends upwardly above the axis of rotation and is provided with a finger 47 which projects into and arcuate recess 48 formed in an exterior wall of housing 21. By cooperation between finger 47 and arcuate recess 48, the limits of reciprocating motion of each bracket 44 is thereby determined. As best seen in FIGS. 1 and 3, each bracket 44 carries a lever 18 or 18' secured thereto by means of screws 49 and thus it will be understood that reciprocation by the operator of the levers forming the handlebars between the full and phantom line positions shown in FIG. 1 will result in reciprocation of rack teeth 41 between the full and phantom line positions shown in FIG. 2 to thereby sequentially rotate pinion 38 in the counter-clockwise and clockwise directions.

Figure 2:
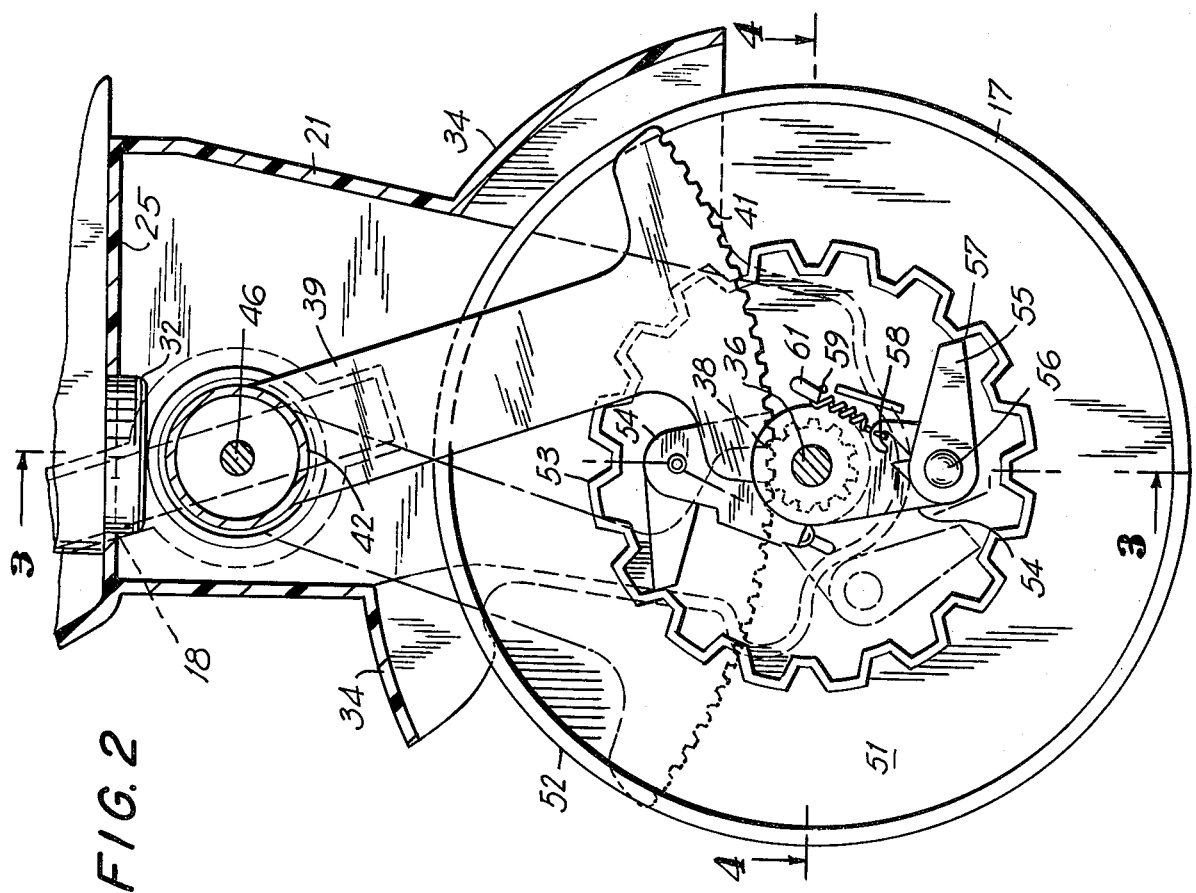
FIG. 2 is a partial sectional view, at an enlarged scale, taken along line 2—2 of FIG. 1.
Figure 4:
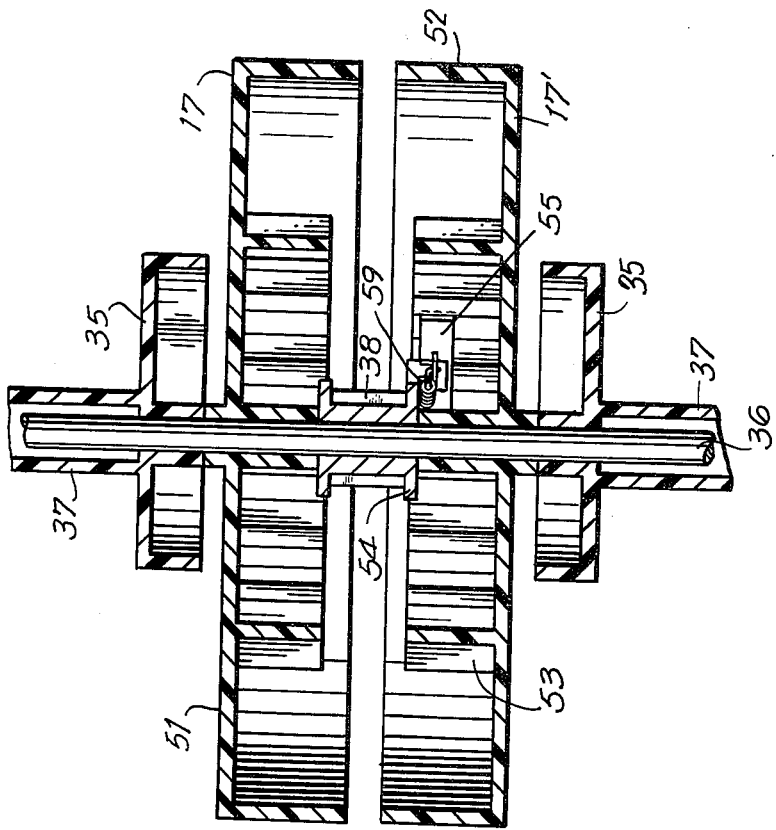
FIG. 4 is a partial sectional view taken along line 4—4 of FIG. 2.

Referring more particularly to FIGS. 2 through 4, wheels 17, 17' are rotatably journalled on axle 36. Each wheel has an outer face 51, a peripheral ground engaging portion 52 and an intermediately disposed inwardly projecting wall 53 through which the wheel is driven. Wall 53, with respect to the axis of rotation of the wheel, is formed as a series of alternating ridges and recesses positioned along an annulus to define an internal gear formed integrally with the wheel of plastic material. The means for driving the gear 53 on each wheel will now be described.

Fixed to each face of pinion 38 is a plate 54 which rotates with the pinion 38. To the remote end of plate 54 is pivoted a bell crank 55. Bell crank 55 is pivoted intermediate its ends by means of a rivet 56. One end of bell crank 55 extends toward and engages gear 53 along a chord thereof. The outer end 57 is adapted to drivingly engage gear 53. The other end of bell crank 55 is provided with a hook position 58. A tension spring 59 connects between hook portion 58 and an ear 61 on plate 54 whereby to bias the outer end 57 of bell crank 55 into engagement with gear 53. The plate 54, bell crank 55 and associated elements provide the means for driving the gear 53 on each wheel 17, 17' and each such means in association with one of the wheels is identical except for opposite orientation so that both wheels 17, 17' are driven in the same direction.

With reference to FIG. 2, it can be seen that, as plate 39 is rotated in a clockwise direction from the full to the phantom line position, pinion 38 will be driven counter-clockwise thereby rotating plate 54 in a counter-clockwise direction. With spring 59 maintaining the contact between outer end 57 of bell crank 55 with the teeth of gear 53, wheel 17 will be likewise driven in a counter-clockwise direction. When plate 39 is reciprocated in the reverse direction, the outer end 57 of bell crank 55 will cam over the teeth of gear 53 against the biasing of spring 59 and thus the mechanism will drive in a single direction only.

The foregoing construction allows the maximum number of inexpensive parts to be utilized. For example, a ground engaging front wheel 17 including a gear 53 may be inexpensively molded of plastic material. Bell crank 55 is also preferably formed of plastic material so that engagement between outer end 57 and gear 53 will not be damaging to the plastic gear. Also, the mechanism disclosed herein avoids the necessity of close tolerances thereby further reducing tooling and production costs. Furthermore, it is noted that the driving mechanism is completely housed within the oppositely disposed front wheels whereby possible damage by the child is minimized.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A toy vehicle comprising a body carrying at least one ground engaging wheel, a housing carrying at least one ground engaging wheel and connecting means acting between said body and said housing for pivotally connecting said body and said housing about a generally vertical axis whereby said vehicle may be steered, said connecting means including an extension on said body, a pair of vertically aligned and oppositely extending cylindrical hubs on said extension, a horizontally positioned wall on said housing, a cylindrical aperture in said wall, a cap removably connected to said housing and a cylindrical recess in said cap, said cylindrical aperture and said cylindrical recess when said cap is affixed to said housing defining a pair of spaced vertically aligned journals, said cylindrical hubs being mounted in said journals.

* * * * *